(12) United States Patent
Nguyen et al.

(10) Patent No.: US 7,984,313 B2
(45) Date of Patent: Jul. 19, 2011

(54) METHOD, APPARATUS AND SYSTEM FOR REDUCING POWER CONSUMPTION INVOLVING DATA STORAGE DEVICES

(75) Inventors: Lu Nguyen, Tampa, FL (US); Mark James Seaman, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 618 days.

(21) Appl. No.: 12/105,217

(22) Filed: Apr. 17, 2008

(65) Prior Publication Data

US 2009/0265567 A1    Oct. 22, 2009

(51) Int. Cl.
  *G06F 1/32*    (2006.01)
  *G06F 1/26*    (2006.01)
(52) U.S. Cl. .................... 713/320; 711/360; 711/369
(58) Field of Classification Search .................. 713/300, 713/310, 320, 321, 322, 323, 324, 340; 711/360, 711/369
See application file for complete search history.

(56) References Cited

U.S. PATENT DOCUMENTS

| | | | |
|---|---|---|---|
| 6,341,331 B1 | 1/2002 | McNutt | |
| 6,418,510 B1 | 7/2002 | Lamberts | |
| 6,463,509 B1 | 10/2002 | Teoman et al. | |
| 6,948,033 B2 | 9/2005 | Ninose et al. | |
| 7,103,710 B2 | 9/2006 | Fujimoto et al. | |
| 7,489,584 B2 * | 2/2009 | Dang et al. | 365/230.03 |
| 2004/0139365 A1 | 7/2004 | Hosoya | |
| 2007/0067559 A1 * | 3/2007 | Fujibayashi et al. | 711/112 |

* cited by examiner

*Primary Examiner* — Thomas Lee
*Assistant Examiner* — Samantha Hoang
(74) *Attorney, Agent, or Firm* — Kenneth L. Sherman, Esq.; Michael Zarrabian, Esq.; Myers Andras Sherman & Zarrabian LLP

(57) ABSTRACT

The invention provides a method, apparatus and system for reducing power consumption involving data storage devices. One embodiment involves a process for storing data in a first memory, and in response to the first memory exceeding a first threshold, migrating the data from the first memory to a second memory. In response to the second memory exceeding a second threshold, the process then involves migrating the data from the second memory to the third memory, wherein the second memory is sized and configured to store data targeted for the third memory to intelligently maintain a portion of the third memory in an inactive state.

20 Claims, 7 Drawing Sheets

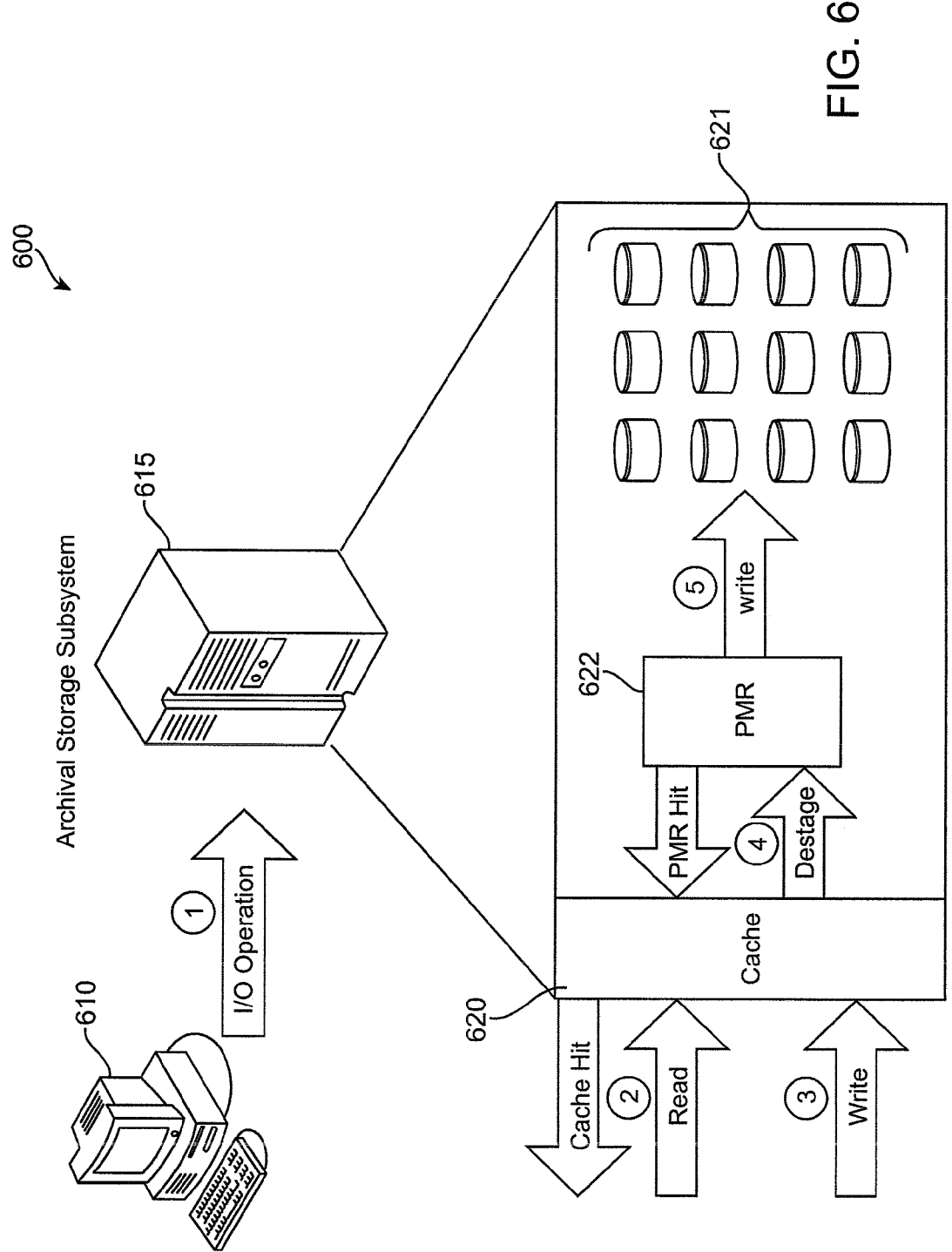

METHOD, APPARATUS AND SYSTEM FOR REDUCING POWER CONSUMPTION INVOLVING DATA STORAGE DEVICES

BACKGROUND OF THE INVENTION

1. Field of the Invention

The present invention relates generally to reducing power consumption in memory devices, and in particular to reducing power consumption in memory sub-system storage devices.

2. Background Information

With an increasing number of computer system users, larger applications, and video/audio streams, the amount of sub-system memory usage and storage device utilization is on the increase. Higher memory use results in a higher need for storage sub-system devices such as disk drive arrays and other sub-system memory devices. The amount of electrical power used by such sub-system, therefore, is also increasing, resulting in increasing costs and heat transfer.

The increased heat transfer and power usage of the storage sub-systems further reduces the life of the storage sub-systems.

BRIEF SUMMARY OF THE INVENTION

The invention provides a method, apparatus and system for reducing power consumption involving data storage devices. One embodiment involves a process for storing data in a first memory, and in response to the first memory exceeding a first threshold, migrating the data from the first memory to a second memory. In response to the second memory exceeding a second threshold, the process then involves migrating the data from the second memory to a third memory, wherein the second memory is sized and configured to store data targeted for a third memory to intelligently maintain a portion of the third memory in an inactive state.

In another embodiment of the invention, an apparatus for reducing power consumption comprises a memory sub-system including a first memory, at least one second memory, a third memory, and a controller connected to the first memory, the second memory and the third memory. The second memory is intelligently sized based on third memory activity. The controller is configured such that in response to data instructions targeted for one of the first memory and the second memory, the controller intelligently maintains grouped and rearranged portions of the third memory in an inactive state until requested access.

Yet another embodiment of the invention provides, in a data storage system including a first memory storage device, a second memory storage device and a plurality of third memory storage devices, a method for storing data in the storage system including receiving data instructions targeted for one of the first memory storage device and the second memory storage device. In response to the targeting data instructions, maintaining one or more of the third memory storage devices inactive until receiving a data instruction targeted for one or more of the third memory storage devices. The second memory is intelligently sized based on third memory activity, and the one or more third memory storage devices are intelligently grouped and rearranged into portions based on access.

Still yet another embodiment of the invention is a distributed data storage system comprising many processing devices connected to many memory sub-system storage devices. Each of the memory sub-system storage devices including at least one cache memory device, at least one second memory device, and many third memory devices. The at least one second memory device operates to replace functionality of the plurality of third memory devices by including a predetermined amount of memory space to save power by maintaining a number intelligently grouped and rearranged portions of the plurality of third memory devices powered off Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which:

FIG. 6 illustrates a storage sub-system for reducing power consumption for memory, according to one embodiment of the invention.

DESCRIPTION OF THE PREFERRED EMBODIMENTS

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The description may disclose several preferred embodiments of memory storage power reduction systems, as well as operation and/or component parts thereof. While the following description will be described in terms of memory storage sub-systems for clarity and to place the invention in context, it should be kept in mind that the teachings herein may have broad application to all types of data recording and data storage.

The invention provides a method, apparatus and system for reducing power consumption involving data storage devices. One embodiment involves a process for storing data in a first memory, and in response to the first memory exceeding a first threshold, migrating the data from the first memory to a second memory. In response to the second memory exceeding a second threshold, the process then involves migrating the data from the second memory to a third memory, wherein the second memory is sized and configured to store data targeted for the third memory to intelligently maintain a portion of the third memory in an inactive state.

Figure 1A:
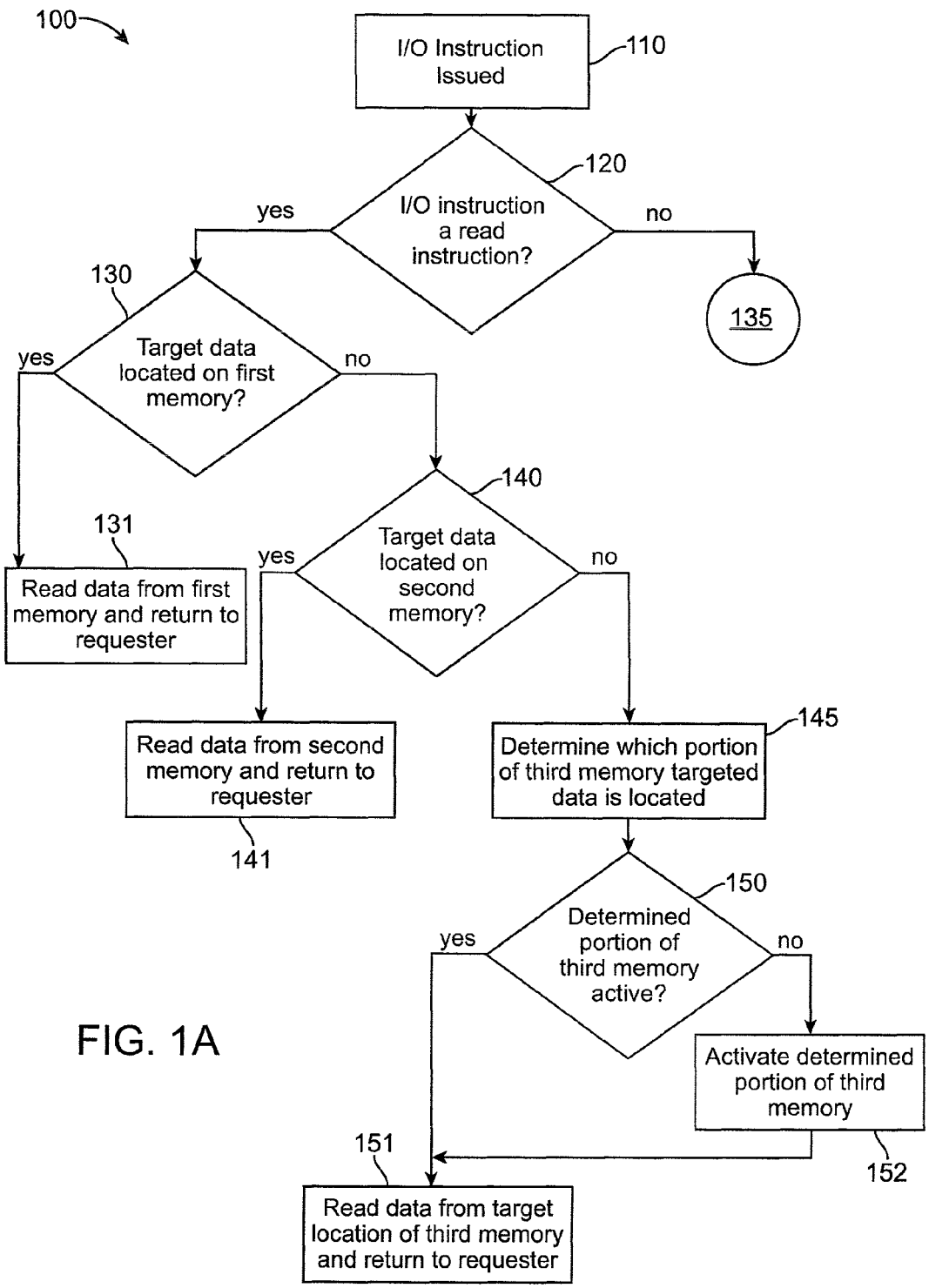
FIGS. 1A-B illustrates a method for reducing power consumption for memory, according to an embodiment of the invention.
Figure 1B:
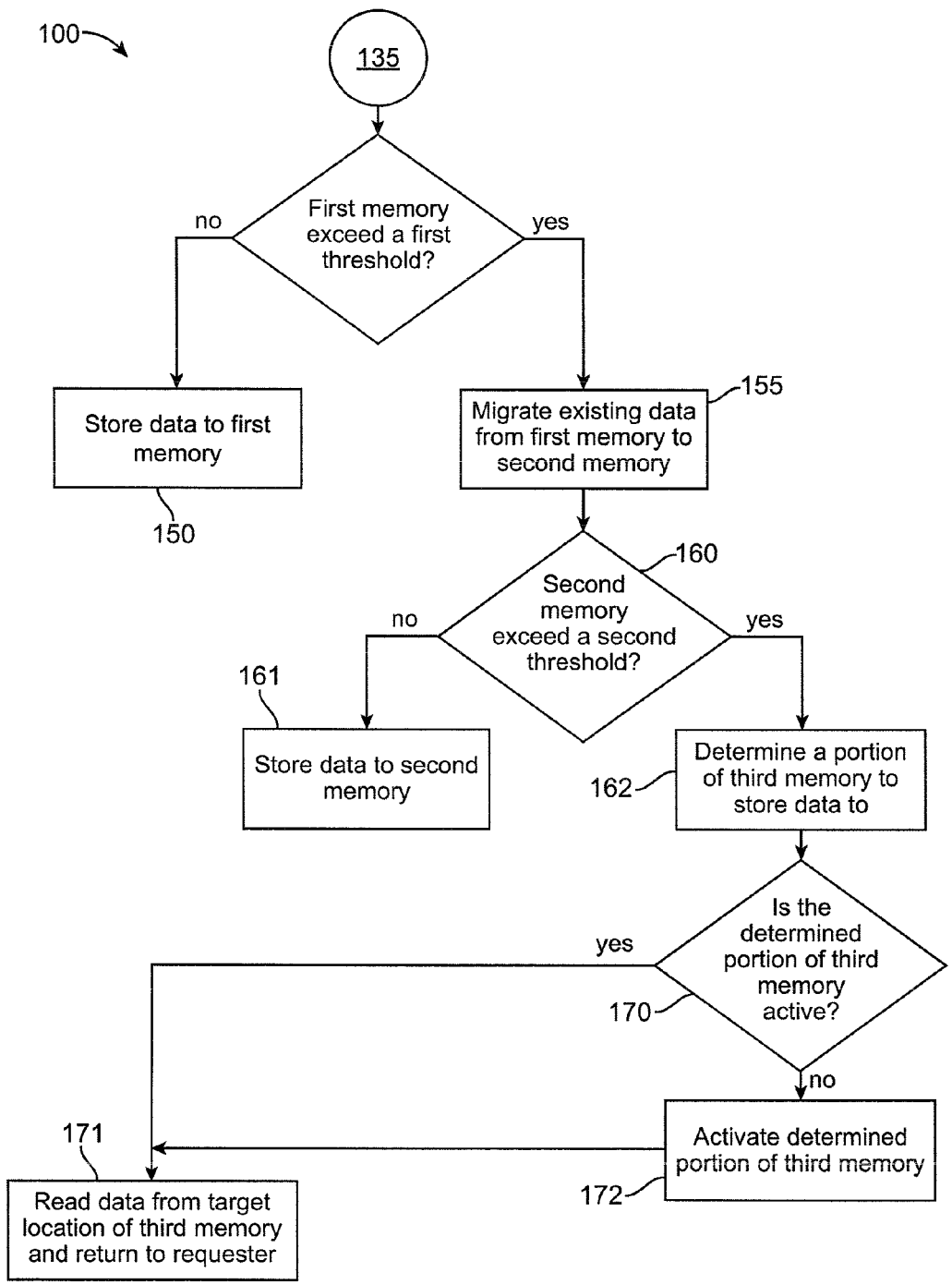

FIGS. 1A-B illustrates an embodiment of the invention including a process 100 for accessing memory. It should be noted that in one embodiment of the invention process 100 can be executed from device 300, distributed data storage system 400 and system 600 (see FIGS. 3-4 and 6). Other embodiments of the invention may include other processing devices, modules, etc. to execute process 100. The process 100 begins with an Input/Output (I/O) instruction issuing at block 110. At block 120, it is determined whether the I/O instruction is a read instruction. If it is determined in block 120 that the I/O instruction issued is not a read instruction, process 100 continues with block 135, otherwise process 100 continues to block 130.

In one embodiment of the invention in block 135 it is determined if a first memory exceeds a first memory storage size threshold. in one embodiment, the first memory is a physical cache memory. In other embodiments, first memory can be other types of first hierarchical memory in a chain of memory hierarchy. For example, the first memory can be a virtual cache memory, an Electrically Erasable Programmable Read-Only Memory (EEPROM) or "flash" memory, virtual flash memory, or any other fast memory whether physical or virtual. In one embodiment of the invention, the first threshold is based on a predetermined amount of memory size amount. In this embodiment, the predetermined size of memory amount can be a percentage (e.g., 50%, 75%, 85%, 95%, etc.) of the overall total memory storage capacity, the total amount of storage capacity (i.e., whether the first memory is full or not) or any combination.

If it is determined that the first memory threshold is not exceeded, the process 100 continues with block 150 where the data in the write instruction is stored in the targeted first memory. If it is determined in block 135 that the first memory threshold has been exceeded, process 100 continues with block 155. In block 155, the existing data stored in the first memory is migrated to a second memory. In one embodiment of the invention, migration is a combination of moving data from the first memory to the second memory and deleting or erasing the data originally stored in the first memory. In one embodiment, second memory is one or more secondary hierarchical physical or virtual memory devices.

Secondary memory can be any type of known physical memory, such as Random Access Memory (RAM), static RAM (SRAM), dynamic RAM (DRAM), synchronous DRAM (SDRAM), double data rate synchronous DRAM (DDR SDRAM), hard drives, Universal Serial Bus memory, etc. In one embodiment of the invention, the second memory is originally non-existent in a memory sub-system storage device. In this embodiment, secondary memory is added to a system along with process 100 to reduce sub-system power usage and to extend the life of third memory devices (e.g., disk drive memory arrays, networked sub-system storage devices, Fiber Channel (FC) disks, high capacity tape drives, Internet Small Computer System Interface memory storage (iSCSI), Network Attached Storage devices (NAS), etc.).

In one embodiment, the amount of blocks of memory that change in a system over a selected time period is measured. In one embodiment, the total blocks measured include blocks in first memory and third memory. In this embodiment, the size of the second memory is selected to contain at least the measured amount of blocks of memory that changed over the selected time period. It should be noted that by blocks that change include blocks that have values that change.

The process 100 continues with block 160. In block 160, it is determined whether the second memory exceeds a second memory threshold. In one embodiment of the invention the second threshold is based on a predetermined amount of the total size of second memory storage size amount. In this embodiment, the predetermined size of memory storage amount can be a percentage (e.g., 50%, 75%, 85%, 95%, etc.) of the overall total memory storage capacity, the total amount of storage capacity (i.e., whether the second memory is full or not), based on a time period (e.g., hours, days, weeks, months, etc.) or any combination.

If it is determined in block 160 that the second memory threshold has not been exceeded, the process 100 continues with block 161. In block 161, the data in the write instruction is stored in the secondary memory. If it is determined in block 160 that the second memory exceeds the second memory threshold, the process 100 continues with block 162. In block 162, it is determined which portion of a third memory is targeted for storing the data in the write instruction. In one embodiment, third memory comprises multiple sub-system disk drives or disk drive arrays. In another embodiment, third memory is one of collocated with the first and second memory or remotely located in a different location, whether in close proximity or very far away (e.g., a mile, 100 miles, 1000 miles, 10,000 miles, etc.). That is, third memory can be communicated with (e.g., by a processing unit, a controller, remote processing units, etc.) over a bus, an intranet, the Internet, wirelessly, etc. In yet another embodiment of the invention, it is determined whether the second memory exceeds a third threshold. In this embodiment, after the second threshold is exceeded, the third memory is activated. Upon the third threshold being exceeded, data is written to the third memory. In this embodiment of the invention, the second threshold is less than the third threshold (e.g., the second memory threshold is 85%, etc.; the third memory threshold is 95%, etc.). In this embodiment of the invention, the second threshold causes the activation of the third memory, and the third threshold being exceeded causes the third memory to be written to. In this embodiment, after all the data is written to the third memory, the third memory is deactivated.

In yet another embodiment, when it is determined that long sequential read instructions and write instructions are occurring, it is determined which third memory portions are needed to be activated for the long sequential accessing. In this embodiment, the third memory portions necessary for accessing due to the long sequential read and write instructions are activated before the portions are actually needed. After the portions are accessed, they can be deactivated until future need. In this manner, the portions of third memory can maintain being placed in an inactive state until it is predicted that the third memory is needed to be accessed. This assists in maintaining performance as the long sequential read/write instructions do not have to wait for the third memory to be activated when required to be accessed. That is, based on the prediction, the third memory is activated before it is actually required.

After it is determined which portion of the third memory is targeted for storing the data in the write instruction, process 100 continues with block 170. In block 170, it is determined whether the targeted portion of third memory to store the data in the write instruction is active or not. If it is determined that the targeted third memory portion to store the data in the write instruction is active, process 100 continues with block 171. It should be noted that the term active includes states where the third memory is accessible, not in a sleep/low power mode or in an off state where the third memory has to first be activated before memory portions are accessible.

In block 171, the data from the second memory is migrated to a third memory. In one embodiment of the invention, migration is a combination of moving data from the second memory to the third memory and deleting or erasing the data originally stored in the second memory. In one embodiment, third memory is one or more third hierarchical physical or virtual memory devices. It should be noted that the term hierarchical is consistent with the access of each hierarchical member in ordered fashion. That is, the first hierarchical memory has priority over the second hierarchical memory, which has priority over the third hierarchical memory.

If it is determined in block 170 that the targeted third memory portion is in an active state, the process 100 continues with block 172 where the third memory portion is activated. That is, the inactive third memory portion is switched from a non-powered on or low powered state to a full powered on state. Process 100 then continues to block 171 where the data stored in the second memory is migrated to the now active targeted portion of the third memory.

In another embodiment of the invention, I/O write instructions can be directly targeted to the second memory or to the third memory. In the case the I/O write instruction is directly targeted to a portion of the third memory, process 100 would proceed from block 120 to block 162 directly and then continue on to block 170 as previously mentioned. In this embodiment, specific write instructions to a portion of the third memory would pertain to data not expected to be accessed in a predetermined time period (e.g., day(s), week(s), month(s), etc.). In one embodiment of the invention these write instructions pertain to archive data, retired data (e.g., completed projects, terminated projects, terminated employee data, replaced data, old programming data, etc.).

If it is determined in block 120 that the I/O instruction is a read instruction, process 100 continues with block 130 where it is determined if the read instruction is targeting data stored in the first memory. If it is determined that the read instruction is targeted for the first memory, process 100 continues to block 131 where the targeted data is read from the first memory and returned as instructed. If it is determined that the read instruction is not targeted for data stored on the first memory, process 100 continues with block 140.

In one embodiment of the invention, block 140 determines if the read instruction is targeted for data stored on the second memory. If it is determined that the read instruction is targeted for data stored on the second memory, process 100 continues with block 141 where the targeted data is read from the second memory and returned as requested. If it is determined that the read instruction is not targeted for data stored on the second memory, the process 100 continues with block 145 where the portion of the third memory targeted for a read instruction is determined.

Once the portion of the third memory that the read instruction targets stored data is determined in block 145, the process 100 continues with block 150. In block 150, it is determined whether the portion of third memory where the targeted data is stored is active or not. If the targeted third memory portion is determined to be in an active state, the process 100 continues with block 151. In block 151, the targeted data is read from the portion of activated third memory and returned as requested. If block 150 determines that the targeted portion of third memory is in an inactive state, process 100 continues to block 152.

In block 152 the portion of third memory that is currently in an inactive state is commanded to become active (i.e., returns from an "off" or low power state to an "on" or full power state). Process 100 then continues to block 151 to proceed with reading the targeted data.

Figure 2:
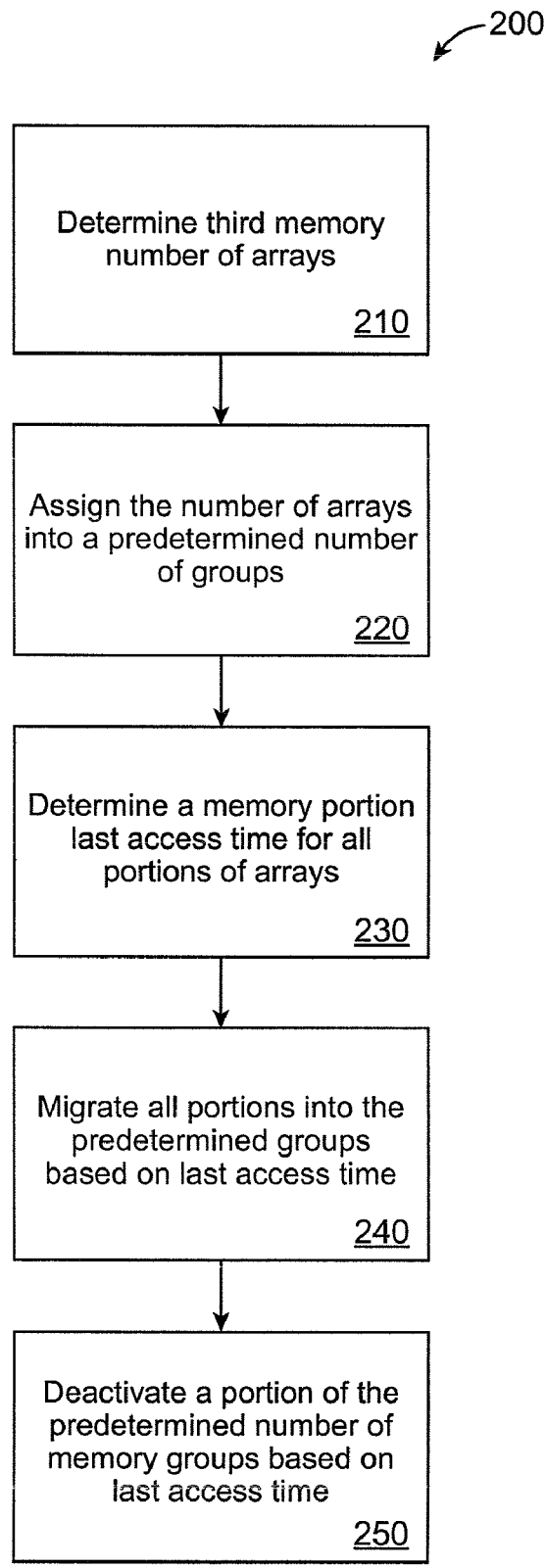
FIG. 2 illustrates another method for reducing power consumption in memory, according to another embodiment of the invention.

FIG. 2 illustrates another embodiment of the invention of a process for reducing power use in memory devices. It should be noted that in one embodiment of the invention process 200 can be executed by itself, or in combination with any of processes 100 and 500 in device 300, distributed data storage system 400 and system 600 (see FIGS. 3-4 and 6). Other embodiments of the invention may include other processing devices, modules, etc. to execute process 200. Process 200 begins with block 210 where the number of existing third memory portions (e.g., disk drive memory arrays, networked sub-system storage devices, FC disks, high capacity tape drives, iSCSI, NAS, etc.) is determined in a device or system. Process 200 then continues with block 220 where the third memory portions are assigned into a predetermined number of groups (e.g., 2, 3, 4, etc.). In one embodiment, the number of groups is based on the total number of portions that exist and the number of active portions of third memory that exist. For example, if the total number of portions of third memory is 3000, and the number of active portions is 1000 or less, the number of groups will be evenly divided into three groups of 1000 portions each. It should be noted that other techniques can be used to divide the third memory portions into groups.

Process 200 continues with block 230 where the last access time for all third memory portions is determined. In one embodiment, a field in the portion of third memory indicates the last access time. In one embodiment, the third memory portions are separated into Logical Unit Numbers (LUNs). In other embodiments, the third memory portions are separated into cylinders or tracks of a device. The third memory portions are then placed in a list that is ordered by last access time. Process 200 continues with block 240 where the portions of third memory are migrated into the divided memory groups based on access time. Process 200 then continues with block 250 where the portions of third memory that were migrated into groups having the least last access time are maintained in an active state, while the portions of third memory that were migrated into groups having a greater last access time are deactivated (i.e., placed in a power "off" state or a low power state).

In one embodiment of the invention, the group having the most accessed portions is more likely to be accessed again. However, the groups having the lesser accessed portions are not as likely to be accessed. Therefore, the amount of power required to power all the third memory portions is reduced by the number of groups that are deactivated. In one embodiment, block 230 is repeated at predetermined times. For example, the last access times can be determined for all third memory portions periodically (e.g., every two hours, four hours, eight hours, day or two, week, etc.).

Figure 3:
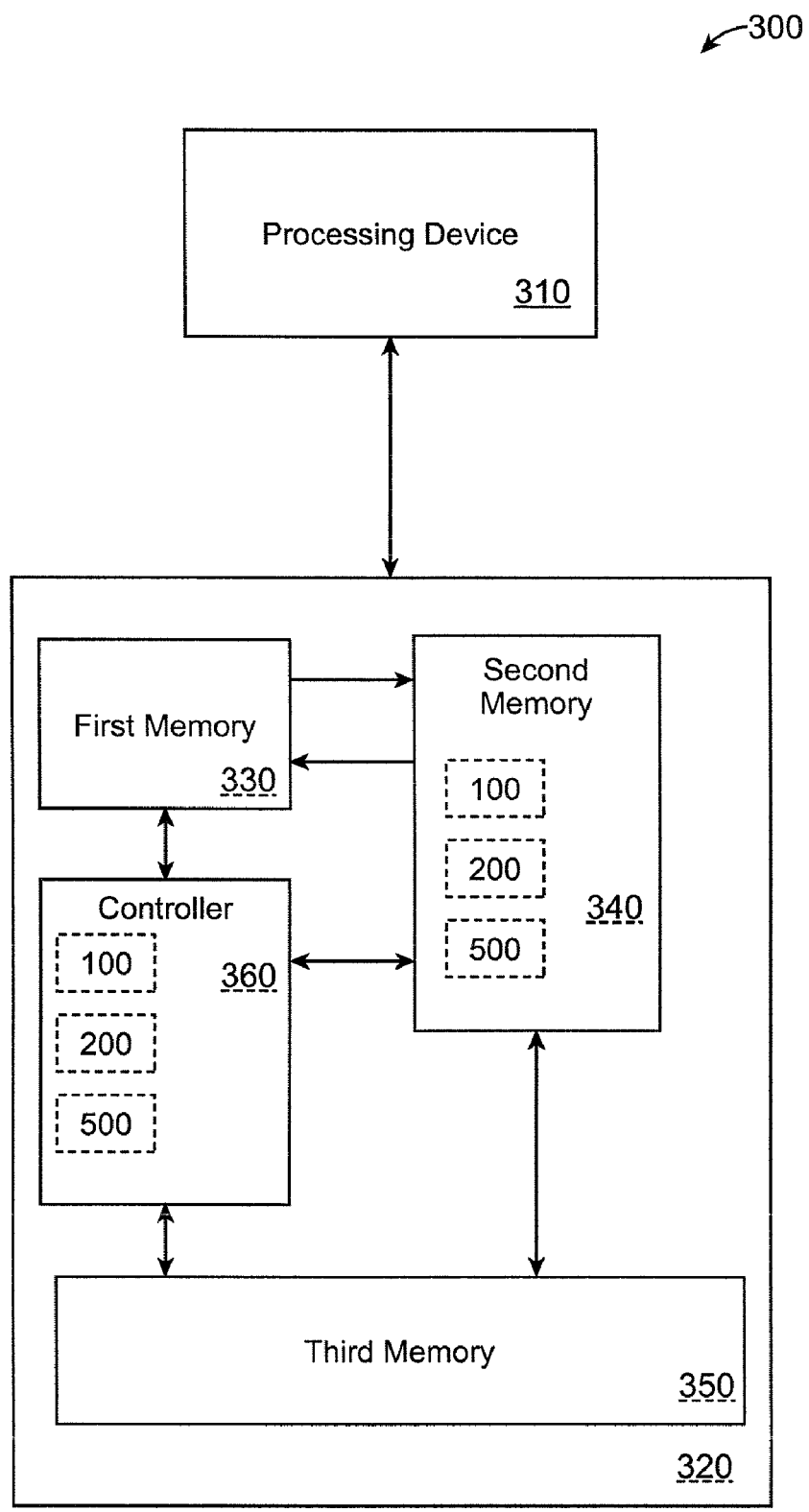
FIG. 3 illustrates a device for reducing power consumption in memory, according to yet another embodiment of the invention.

FIG. 3 illustrates device 300 that operates to reduce power consumption. As illustrated, device 300 includes a processing device 310. In one embodiment, device 310 is a computing device, such as a personal computer, server, portable computing device, etc. The processing device 310 is connected to a memory sub-storage device 320. In one embodiment, the memory sub-storage device 320 includes a first memory 330, a second memory 340, a third memory 350 and a memory controller 360. In one embodiment, the memory sub-storage device 320 includes more than one second memory 340 (e.g., two, three, four, etc.). In another embodiment, the memory sub-storage device 320 includes more than one third memory device 350 (e.g., two, three, four, etc.).

In one embodiment, device 300 includes computer readable medium including processes 100, 200, 500 (see FIG. 5), or a combination of process 100, 200 and 500, that are executed by device 300, controller 360, or a combination of both device 300 and controller 360. In one embodiment the processes 100, 200 and 500 can be distributed in modules disposed in or coupled to the controller 360. In one embodiment, modules 100, 200 and/or 500 can be stored in second memory 340 and ran by a separate processor or other hardware attached to the second memory 340 (not shown) or other components of device 300. In this embodiment, in response to processing device 310 targeting data instructions for the first memory 330 or the second memory 340, the memory sub-storage device 320 maintains the third memory 350 in an inactive state. In one embodiment, first memory 330, second memory 340 and third memory 350 are hierarchical. For example, first memory 330 has a hierarchy of n, second memory has a hierarchy of n+1, and third memory 350 has a hierarchy of n+2. Therefore, first memory 330 (n) has portions of memory that are accessed more often than a second memory 340 (n+1), which has portions of memory that are accessed more often than third memory 350 (n+2), where n is a positive integer, in this example n=1. In one embodiment, the hierarchical memory groups other than hierarchical memory group n are powered off until data stored on the other hierarchical memory groups are targeted with an instruction (e.g., a read or write instruction).

In one embodiment of the invention, processing device 310 is directly connected to memory sub-storage system 320. In this embodiment, memory sub-storage device 320 can be a centrally accessed storage sub-system connected to multiple processing devices 310. In yet another embodiment of the invention, processing device 310 is portable and connects to memory sub-storage device 320 wirelessly or through a network (e.g., Internet, Intranet, etc.).

Figure 4:
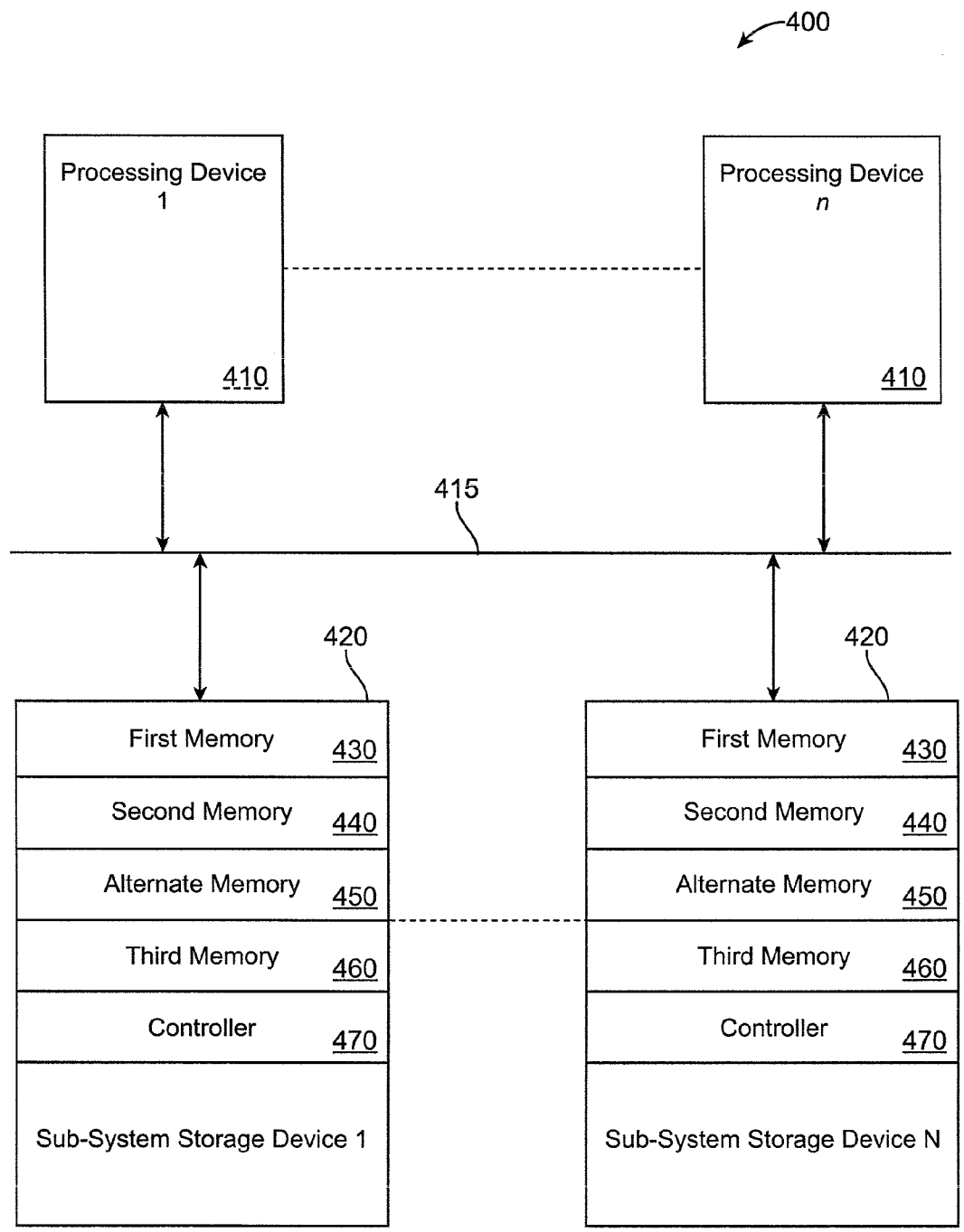
FIG. 4 illustrates a system for reducing power consumption in memory, according to still another embodiment of the invention.

FIG. 4 illustrates a distributed data storage system 400. In one embodiment, the distributed data storage system 400 includes computer readable medium including processes 100, 200, 500 (see FIG. 5), or a combination of process 100, 200 and 500, that are executed by processing devices 410, controller 470, or a combination of both processing devices 410 and controller 470. In one embodiment, distributed storage system 400 includes computer readable medium including processes 100, 200, 500, or a combination of process 100, 200 and 500, that are executed by processing devices 410, controller 470, or a combination of both processing devices 410 and controller 470. In one embodiment the processes 100, 200 and 500 can be distributed in modules disposed in or coupled to the controller 470. In another embodiment, modules 100, 200 and/or 500 can be stored in second memory 440 or any alternative memory device and ran by a separate processor or other hardware attached to second memory 440 (not shown) or included in distributed data storage system 400. Distributed data storage system 400 includes a number of processing devices (1 to n, n being a positive integer) connected to a number of memory sub-system storage devices 420 via connection 415. In one embodiment of the invention, connection 415 can be a bus, network, wireless network, Internet, etc. In one embodiment of the invention, each of the memory sub-system storage devices 420 include at least one first memory device 430 (e.g., a cache memory device, flash memory device, etc.), at least one second memory device 440 (e.g., RAM), SRAM, DRAM, SDRAM), DDR SDRAM, hard drives, Universal Serial Bus memory, etc., and a number of third memory devices 460 (e.g., disk drive memory arrays, networked sub-system storage devices, FC disks, high capacity tape drives, iSCSI, NAS, etc.).

In one embodiment of the invention, the memory sub-system storage device 420 includes a memory controller 470 and an alternate memory 450. In one embodiment of the invention, the alternate memory device 450 can perform as an additional first memory device 430, an additional second memory device 440 and an additional third memory device 460. In another embodiment of the invention, a number of alternate memory devices 450 exist where the number of alternate memory devices 450 can be any combination of first memory devices 430, second memory devices 440 and third memory devices 460.

In one embodiment of the invention, the at least one second memory device 440 operates to replace functionality of a number of third memory devices 460 by maintaining a predetermined amount of memory space to save power by maintaining a number of the third memory devices 460 in a powered off or low power state. In this embodiment of the invention second memory devices 440 require less power than the third memory devices 460. Maintaining the third memory devices 460 powered off or in a low power state unless required to be activated thus saves the amount of power between having second memory devices 440 powered on and third memory devices 460 powered off (or in a low power state).

In one embodiment of distributed data storage system 400, the third memory devices 460 are divided into a number of hierarchical accessed memory groups (i.e., 1 to n, n being a positive number≧1). In this embodiment a hierarchical memory group n has portions of memory that are accessed more often than a hierarchical memory group n+1, and hierarchical memory groups other than hierarchical memory group n are powered off or kept in a low power state until data stored on the other hierarchical memory groups are targeted with an instruction (e.g., a read instruction, a write instruction, etc.)

Figure 5:
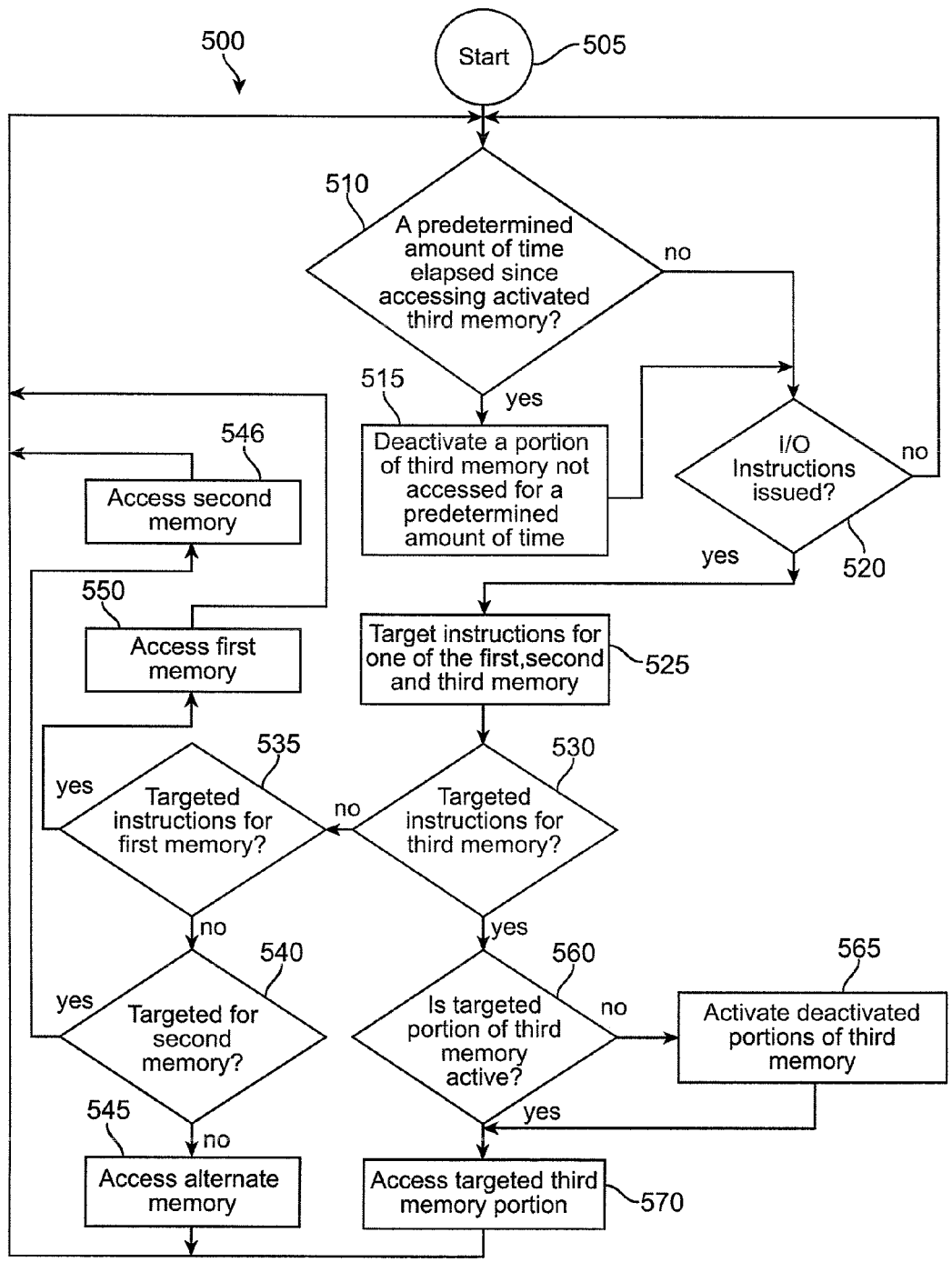
FIG. 5 illustrates a method for reducing power consumption for memory, according to an embodiment of the invention.

FIG. 5 illustrates a power reducing process 500. It should be noted that in one embodiment of the invention, process 500 can be executed by itself, or in combination with any of processes 100 and 200 in device 300, distributed data storage system 400 and system 600 (see FIGS. 3-4 and 6). Other embodiments of the invention may include other processing devices, modules, etc. to execute process 200. Process 500 starts at block 505 and continues with block 510 where it is determined if a predetermined amount of time has elapsed since an active third memory device (e.g., device 350, 430) was accessed. In this embodiment, the predetermined time can be manually set (e.g., set: minutes, hours, days, weeks, etc.) or determined based on optimized statistics based on cycling power, amount of power savings, access time averages, etc. If it is determined that the predetermined amount of time has elapsed in block 510, process 500 continues with block 515.

In block 515, since the predetermined time has elapsed and the third memory (or portion of third memory) has not been accessed, the third memory (or portion of third memory) is deactivated or placed in a low power state and process 500 continues with block 520. If the predetermined time in block 510 has not elapsed, process 500 continues with block 520. In block 520, it is determined whether an I/O instruction has been issued or not. If it is determined that no I/O instructions have been issued, process 500 continues with block 510. If it is determined that I/O instructions have been issued, process 500 continues with block 525.

In block 525 the instructions are determined to be targeted for a first memory (e.g., 330, 430), a second memory (e.g., 340, 440) or a third memory (e.g., 350, 460). Process 500 continues with block 530 where it is determined whether the I/O instruction(s) are targeted for the third memory. If it is determined that the I/O instruction(s) is targeted for the third memory, process 500 continues with block 560. In block 560, it is determined whether the I/O instruction(s) is targeted for a portion of the third memory that is in an active state. If it is determined that the I/O instruction(s) is targeted for an active portion of the third memory, process 500 continues with block 570, where the targeted portion of the third memory is accessed. Process 500 then continues with block 510. If it is determined in block 560 that the I/O instruction(s) is targeted for an inactive portion of the third memory, process 500 continues with block 565, where the targeted portion of the third memory is activated before continuing to block 570.

In block 530, if it is determined that the I/O instruction(s) is not targeted for the third memory, process 500 continues with block 535. In block 535, it is determined whether the I/O instruction(s) is targeted for a first memory. If it is determined that the I/O instruction(s) is targeted for the first memory, process 500 continues with block 550 where the first memory is accessed. Process 500 then continues with block 510. If it is determined that the I/O instruction(s) is not targeted for the first memory, process 500 continues with block 540 where it is determined if the I/O instruction(s) is targeted for the second memory. If it is determined that the I/O instruction(s) is targeted for the second memory, process 500 continues with block 546 where the second memory is accessed. Process 500 then continues with block 510.

If it is determined that the I/O instruction(s) is not targeted for the second memory, process 500 continues with block 545 where an alternate memory device (e.g., 450) is accessed. In one embodiment of the invention, the alternate memory is an additional second memory or third memory.

FIG. 6 illustrates a system 600 for reducing power consumption for memory, according to one embodiment of the invention. In one embodiment of the invention, the system 600 includes storage sub-system 615 and a processing device 610, such as a personal computer, server, portable computing device, etc. Storage sub-system 615 includes a cache memory device 620, a second memory device 622 known as a power management repository (PMR), and a third memory device comprised of a plurality of disk drive arrays 621. In one embodiment of the invention, system 600 further includes a memory controller. In this embodiment, processes 100, 200, 500, or any combination can be executed from the memory controller or from additional processing hardware connected to secondary memory 622.

In one embodiment of the invention, the sub-storage system 600 receives an I/O instruction operation 1 from a processing device 610. If the I/O operation results in a cache memory hit on cache memory device 620, data requested is returned to the requester. If an I/O operation from processing device 610 is a read instruction 2, a controller in storage sub-system 620 is configured to run process 100, 200, 500, or any combination of the three. In one embodiment, if the data requested in a read instruction 2 is stored on a PMR 622, the requested data is returned to the requester from the PMR 622. In the case where the read instruction 2 targets data that is not stored on the cache memory device 620 or the PMR device 622, a controller of storage sub-system 615 determines where the data is stored in the plurality of disk drive arrays 621. If the controller determines that the disk drive portion where the requested data is stored is not active, the controller activates the portion containing the requested data and returns the data to the requester.

In one embodiment, when an I/O operation 1 from processing device 610 is a write instruction 3, the data is first attempted to be stored on the cache memory device 620. In one embodiment, if the storage capacity of the cache memory device 620 exceeds a predetermined threshold, at least a portion of memory blocks in the cache memory device 620 are destaged or migrated to the PMR 622. In this embodiment, if the memory capacity of the PMR 622 exceeds a second storage threshold, the write instruction is then carried out for one of the plurality of disk drives 621 with write command 5.

In one embodiment, the controller first attempts to store the data in the write instruction 5 to an active disk drive. If the portion that the write instruction 5 targets is not active, in one embodiment of the invention the targeted disk drive is activated before being accessed. In this embodiment of the invention, a portion of the disk drives in the plurality of disk drives 621 is deactivated when the data stored on the portion is not accessed for a predetermined time period.

The embodiments of the invention adapt existing devices and systems by modifying by addition of a memory device(s) or virtual memory device(s) or reassignment of an existing memory device(s) or virtual memory device(s) to replace a memory device that uses more or substantially more power than the addition or reassigned memory element. By doing this, some embodiments of the invention can maintain a third memory in an inactive state to reduce overall power consumption, reduce cooling costs, and preserve component life. Systems that write only or write-mostly, such as remote mirroring data systems can take advantage of optimized reduction in power over existing devices and systems.

The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer, processing device, or any instruction execution system. For the purposes of this description, a computer-usable or computer readable medium can be any apparatus that can contain, store, communicate, or transport the program for use by or in connection with the instruction execution system, apparatus, or device.

The medium can be electronic, magnetic, optical, or a semiconductor system (or apparatus or device). Examples of a computer-readable medium include, but are not limited to, a semiconductor or solid state memory, magnetic tape, a removable computer diskette, a RAM, a read-only memory (ROM), a rigid magnetic disk, an optical disk, etc. Current examples of optical disks include compact disk-read only memory (CD-ROM), compact disk-read/write (CD-R/W) and DVD.

I/O devices (including but not limited to keyboards, displays, pointing devices, etc.) can be connected to the system either directly or through intervening controllers. Network adapters may also be connected to the system to enable the data processing system to become connected to other data processing systems or remote printers or storage devices through intervening private or public networks. Modems, cable modems and Ethernet cards are just a few of the currently available types of network adapters.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A data storage method comprising:
storing data in a first memory;
in response to the first memory exceeding a first threshold, migrating the data from the first memory to a second memory;
in response to the second memory exceeding a second threshold, migrating the data from the second memory to a third memory;
organizing the third memory into a plurality of memory sections;
rearranging a set of data units in the third memory into a plurality of memory groups based on last access time to each data unit, the plurality of memory groups corresponding to said plurality of memory sections such that each memory section contains a group of said data units;
wherein the second memory is sized and configured to store data targeted for the third memory to intelligently maintain a portion of the third memory in an inactive state.

2. The method of claim 1, further comprising:
in response to a read instruction, determining if requested data is stored in the first memory, the second memory or the third memory, and in response to the data determined to be stored on the third memory, activating intelligently sized and grouped portions of the third memory for access and retrieving the data from the third memory.

3. The method of claim 1, further comprising:
maintaining a memory section that contains a most recently accessed group of said data units in an active state, and deactivating one or more of the remaining memory sections.

4. The method of claim 1, further comprising:
determining one or more blocks of memory in the third memory that include memory content that changed over a selected time period; and
selecting a memory size for the second memory that is substantially equal to a memory capacity of the one or more blocks of memory in the third memory determined to include memory content that changed over the selected time period.

5. The method of claim 1, further comprising:
in response to the migrating the data from the first memory to the second memory, deleting the data from the first memory; and in response to the migrating the data from the second memory to the third memory based on the first and the second thresholds, deleting the data from the second memory.

6. The method of claim 1, wherein the third memory is distributed throughout at least one network.

7. The method of claim 6, wherein the third memory comprises a plurality of distributed storage devices.

8. An apparatus for reducing power consumption, comprising:
a memory sub-system including:
a first memory;
at least one second memory;
a third memory; and
a controller coupled to the first memory, the second memory and the third memory,
wherein the second memory is intelligently sized based on third memory activity, and the controller is configured such that: in response to data instructions targeted for one of the first memory and the second memory, the controller intelligently maintains grouped and rearranged portions of the third memory in an inactive state until requested access, and the controller further determines a size of the second memory to contain at least a measured amount of blocks of memory that changed over a predetermined length of time.

9. The apparatus of claim 8, wherein the third memory is divided into a plurality of hierarchical memory groups.

10. The apparatus of claim 8, wherein a hierarchical memory group n has portions of memory that are accessed more often than a hierarchical memory group n+1, where n is a positive integer.

11. The apparatus of claim 10, wherein hierarchical memory groups other than hierarchical memory group n are powered off until data stored on the other hierarchical memory groups are targeted with an instruction.

12. The apparatus of claim 8, wherein the third memory includes a plurality of distributed disk drives.

13. In a data storage system including a first memory storage device, a second memory storage device and a plurality of third memory storage devices, a method for storing data in the storage system, comprising:
receiving data instructions targeted for one of the first memory storage device and the second memory storage device;
in response to said targeting data instructions, maintaining one or more of the third memory storage devices inactive until receiving a data instruction targeted for one or more of the third memory storage devices; and
determining a size of the second memory to contain at least the measured amount of blocks of memory that changed over the predetermined length of time,
wherein the second memory is intelligently sized based on third memory activity, and the one or more third memory storage devices are intelligently grouped and rearranged into portions based on access.

14. The method of claim 13, wherein the data instructions are one of read instructions and write instructions.

15. The method of claim 13, further comprising:
dividing the third memory into a plurality of memory sections;
rearranging a set of data units in the third memory into a plurality of memory groups based on last access time to each data unit, the plurality of memory groups corresponding to said plurality of memory sections such that each memory section contains a group of said data units; and maintaining a memory section that contains a most recently accessed group of said data units in an active state, and deactivating one or more of the remaining memory sections.

16. The method of claim 13, further comprising:
measuring an amount of blocks of memory that change in a system over a predetermined length of time.

17. The method of claim 13, wherein the third memory storage devices are distributed throughout a plurality of sub-networks.

18. A distributed data storage system, comprising:
a plurality of processing devices coupled to a plurality of memory sub-system storage devices, each of the memory sub-system storage devices including:
   at least one cache memory device;
   at least one second memory device; and
   a plurality of third memory devices,
wherein the at least one second memory device operates to replace functionality of the plurality of third memory devices by including a predetermined amount of memory space to save power by maintaining a number intelligently grouped and rearranged portions of the plurality of third memory devices powered off, and wherein at least one processing device:
   determines one or more blocks of memory in the plurality third memory devices that include memory content that changed over a selected time period; and
   selects a memory size for the at least one second memory device that is substantially equal to a memory capacity of the one or more blocks of memory in the plurality of third memory devices determined to include memory content that changed over the selected time period.

19. The distributed data storage system of claim 18, wherein the plurality of third memory devices is divided into a plurality of hierarchical accessed memory groups.

20. The distributed data storage system of claim 18, wherein a hierarchical memory group n has portions of memory that are accessed more often than a hierarchical memory group n+1, where n is a positive integer, and hierarchical memory groups other than hierarchical memory group n are powered off until data stored on the other hierarchical memory groups are targeted with an instruction.

* * * * *